(12) United States Patent
Dybkjær

(10) Patent No.: US 6,224,789 B1
(45) Date of Patent: May 1, 2001

(54) PROCESS AND REACTOR SYSTEM FOR PREPARATION OF SYNTHESIS GAS

(75) Inventor: Ib Dybkjær, Copenhagen (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 09/385,724

(22) Filed: Aug. 30, 1999

(30) Foreign Application Priority Data

Sep. 1, 1998 (DK) .............................................. 1998 01098

(51) Int. Cl.[7] .............................. C07C 1/02; C07C 27/00; C01B 31/18; C01B 3/02; C06D 1/02
(52) U.S. Cl. .......................... 252/373; 518/702; 518/704; 423/418.2; 423/648.1; 252/376
(58) Field of Search ................................. 252/373, 376; 423/418.2, 648.1; 518/702, 704

(56) References Cited

U.S. PATENT DOCUMENTS 4,985,231 * 1/1991 Lywood ................................ 423/562
6,077,459 * 1/2000 Laursen et al. ....................... 252/376

* cited by examiner

*Primary Examiner*—Johann Richter
*Assistant Examiner*—J. Parsa
(74) *Attorney, Agent, or Firm*—Ostrolenk, Faber, Gerb & Soffen, LLP

(57) ABSTRACT

Process for the preparation of hydrogen and/or carbon monoxide rich gas by catalytic steam reforming of a hydrocarbon feedstock, wherein a first stream of the feedstock is autothermally steam reformed in parallel with a second stream of the feedstock being steam reformed in presense of a steam reforming catalyst in heat conducting relationship with hot effluent from the autothermal steam reforming and with steam reformed hot effluent withdrawn from steam reforming catalyst, and the effluent from the autothermal steam reforming step and the heat exchange steam reforming step are combined after having supplied heat to steam reforming reactions proceeding in the second stream of the feedstock.

3 Claims, 1 Drawing Sheet

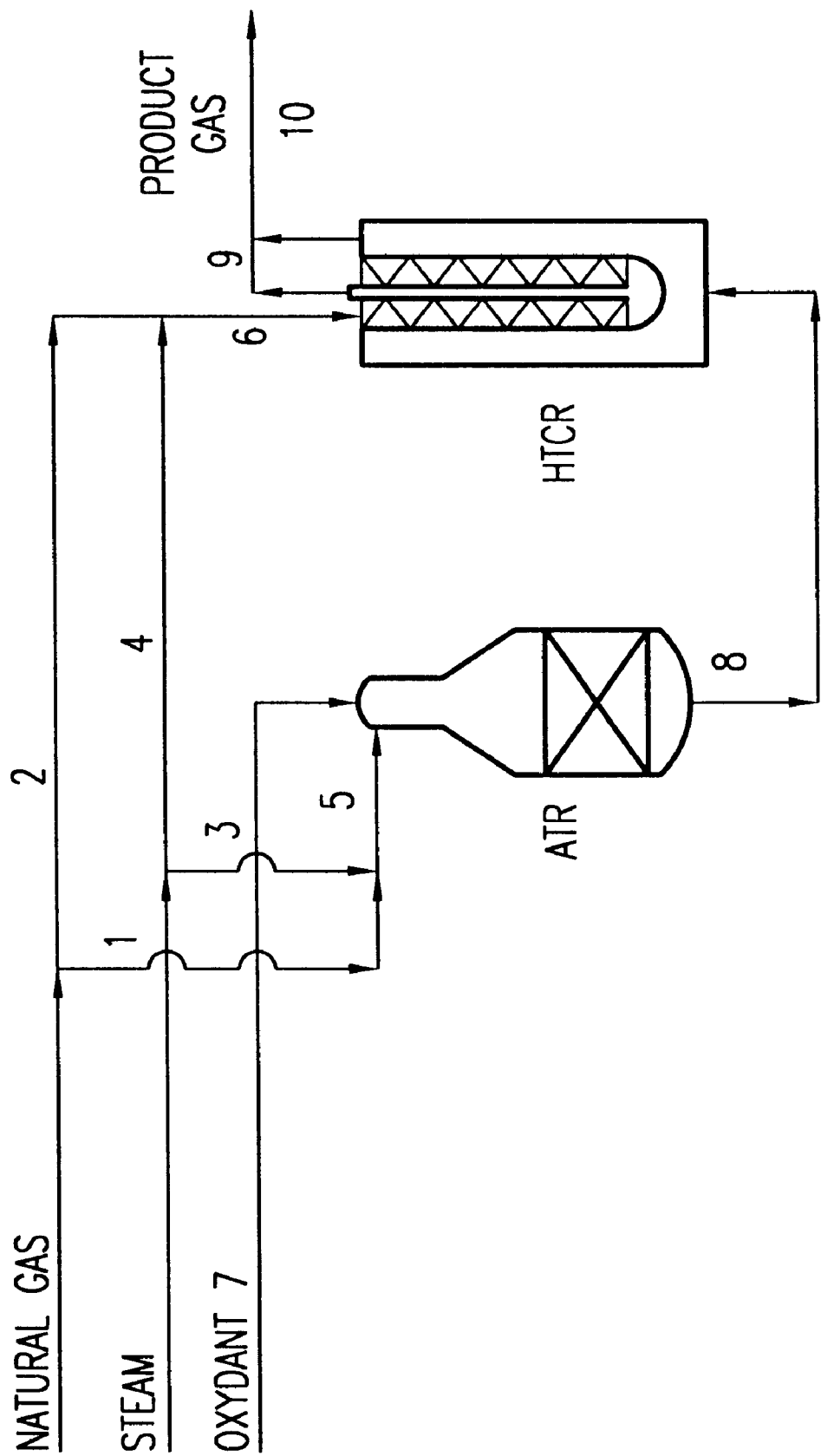

PROCESS AND REACTOR SYSTEM FOR PREPARATION OF SYNTHESIS GAS

The present invention is directed to the preparation of hydrogen and/or carbon monoxide rich synthesis gas by catalytic steam reforming of a hydrocarbon feedstock. In particular, the invention is directed to certain improvements in the production of synthesis gas through parallel steam reforming of the feedstock in an autothermal reformer (ATR) and a heat exchange reformer; wherein a part of the feedstock is autothermally steam reformed in the ATR and remainder of the feedstock in the heat exchange reformer.

By the inventive process a part of the feedstock being catalytically steam reformed in the heat exchange reformer is passed through the reformer in heat conducting relationship with the hot reformed effluent stream from the ATR and is steam reformed effluent stream from a steam reforming catalyst arranged in the heat exchange reformer.

Both steam reformed effluent streams are then combined after having supplied heat to the steam reforming reactions proceeding in the heat exchange reformer in presence of a steam reforming catalyst.

When collecting the steam reformed effluent streams from the ATR and heat exchange reactor after passage through the heat exchange reactor as in the above inventive process, the pressure difference between tubes being provided with the catalyst in the heat exchange reactor and the tubes for withdrawing the steam reformed effluent stream from the reactor can be kept at minimum. As a result, the tubes have improved corrosion and dimension stability and may therefor be made from material with high chemical resistance and lower mechanical strength than in the conventional heat exchange reforming reactors.

In the process of the invention, the steam reforming catalyst arranged in the heat exchange reactor may be in form of a fixed bed or catalyzed hardware, such as the catalyst is applied as thin film on a metallic surface being in contact with the reacting feedstock.

Furthermore, the invention provides a reactor system for use in the above process. The reactor system comprises an autothermal reforming reactor and a heat exchange reactor connected in parallel at inlet side of the reactors and connected in series at outlet side of the autothermal reactor, wherein the heat exchange reactor is provided with at least one reformer tube in form of a double tube with an outer and an inner tube, the outer tube being provided with a reforming catalyst, the inner tube being adapted to withdraw an effluent stream of steam reformed feedstock from the outer tube, the outer tube being concentrically surrounded by a sleeve spaced apart the outer tube and being adapted to pass a hot steam reformed effluent stream from the autothermal reactor in heat conducting relationship with reacting feedstock in the outer tube by conducting the hot effluent stream in space between the sleeve and the outer tube; and a collector upstream the heat exchange reactor for collecting the effluent streams from the heat exchange reactor.

In a specific embodiment of the invention, the reforming catalyst in the heat exchange reactor is applied to in form of a fixed bed between wall of the outer and inner tube or as a thin film on inner wall of the outer tube and/or outer wall of the inner tube.

BRIEF DESCRIPTION OF THE DRAWING

The sole FIGURE is a simplified flow diagram of a specific embodiment of the invention.

DETAILED DESCRIPTION OF THE PREFERRED EMBODIMENT

The above process and reactor system will become more apparent from the following description referring to the drawing.

Desulphurized and preheated natural gas is split into two streams 1 and 2 and mixed with superheated steam, stream 3 and 4, to obtain feed stream 5 (mixed from stream 1 and 3) to an autothermal reformer (ATR) and feed stream 6 to a heat exchange reformer (HTCR). In the ATR, feed stream 5 is reacted with a stream 7 of oxidant (oxygen, oxygen enriched air, or air) over a Ni-containing catalyst to produce a mixture 80 f $H_2$, CO, $CO_2$, residual $CH_4$ and steam, and any inerts ($N_2$ and Ar) contained in the feed streams 1 and 7. In the HTCR, feed stream 6 is reacted over a Ni-containing catalyst contained in the annular space between an inner (bayonet) tube and an outer tube, both made from suitable temperature—and corrosion resistant materials. Heat for the endothermic reactions in the HTCR-catalyst is provided by heat exchange between the exit gas 8 from the ATR and the outer wall of the catalyst containing annulus in the HTCR and also by heat exchange between the exit gas 9 from the catalyst bed in the HTCR and the inner wall of the catalyst containing annulus in the HTCR. After providing heat to the HTCR, the two product streams 8 and 9 are mixed to the final product stream 10. By selecting proper compositions, flows, and conditions of the feed streams 5, 6 and 7, proper operating conditions in the ATR and the HTCR, and proper mechanical design of the ATR and the HTCR, preselected properties of the final product stream 10 can be obtained.

EXAMPLE 1000 k mol $CH_4$ at 550° C. and 40 bar are split into two streams of 750 k mole (stream 1) and 250 k mole (stream 2). Stream 1 is mixed with 1132 k mole steam (stream 3) at 550° C. and 40 bar and used as feed (stream 5) to an ATR together with 430 k mole oxygen (stream 7). The ATR contains a special mixer burner and a conventional Ni-containing steam reforming catalyst which promotes reactions to produce product stream 8, which leaves the ATR at a temperature of 1000° C. Stream 2 is mixed with 500 k mole steam (stream 4) at 550° C. and 40 bar, and the mixture (stream 6) is used as feed to a HTCR. The HTCR contains 100 tubes in parallel, each 12 m long and consisting of an outer tube with dy/di=130.0 mm/122.3 mm and an inner (bayonet) tube with dy/di=48.3 mm/40.9 mm. The annuli between the outer and inner tubes is filled with a conventional Ni-containing catalyst. The feed gas 6 flows downwards through the catalyst filled annuli and is converted and heated. The product gas 9 leaves the catalyst at a temperature of 928° C. and flows upwards through the inner (bayonet) tube, where it is cooled to 638° C. by heat exchange with the catalyst, thereby providing part of the required heat. The remaining heat requirement is provided by heat exchange between the outer tubes and the product gas 8 from the ATR flowing upwards along the outer tube surfaces and being cooled to 600° C. After cooling, the product gases 8 and 9 are mixed to provide a final product gas containing 2129 k mole $H_2$, 656 k mole CO, 254 k mole $CO_2$, and 90 k mole $CH_4$. This gas is suitable for example for production of MeOH, DME, hydrocarbons by Fischer-Tropsch synthesis, or for recovery of $H_2$ and/or CO.

What is claimed is:

1. A process for the preparation of hydrogen and/or carbon monoxide rich gas by catalytic steam reforming of a hydrocarbon feedstock, wherein a first stream of the feedstock is autothermally steam reformed in parallel with a second stream of the feedstock being steam reformed in presense of a steam reforming catalyst in heat conducting relationship with hot effluent from the autothermal steam reforming and with steam reformed hot effluent withdrawn from steam reforming catalyst, and the effluent from the autothermal steam reforming step and the heat exchange steam reforming step are combined after having supplied heat to steam reforming reactions proceeding in the second stream of the feedstock.

2. A process of claim 1, wherein the steam reforming catalyst is in form of a fixed bed of catalyst particles.

3. A process of claim 1, wherein the steam reforming catalyst is in form of a thin film.

\* \* \* \* \*